(12) United States Patent
Hall et al.

(10) Patent No.: US 6,548,027 B1
(45) Date of Patent: Apr. 15, 2003

(54) GAS PURIFICATION DEVICE

(75) Inventors: Stephen Ivor Hall, Oxford (GB);
Michael Inman, Abingdon (GB);
David Raybone, Gloucester (GB);
David Michael Weeks, Abingdon (GB)

(73) Assignee: Accentus, Didcot (GB)

( * ) Notice: Subject to any disclaimer, the term of this patent is extended or adjusted under 35 U.S.C. 154(b) by 0 days.

(21) Appl. No.: 09/446,947

(22) PCT Filed: Jul. 13, 1998

(86) PCT No.: PCT/GB98/02061
§ 371 (c)(1),
(2), (4) Date: Dec. 30, 1999

(87) PCT Pub. No.: WO99/05400
PCT Pub. Date: Feb. 4, 1999

(30) Foreign Application Priority Data

Jul. 23, 1997 (GB) .............................. 9715409

(51) Int. Cl.[7] .............................. B01J 19/08
(52) U.S. Cl. .............................. 422/186.04
(58) Field of Search .............................. 422/186.04

(56) References Cited

U.S. PATENT DOCUMENTS

| 3,607,709 A | * | 9/1971 | Rice ...................... 422/186.07 |
| 3,979,193 A | | 9/1976 | Sikich ......................... 55/123 |
| 4,349,511 A | * | 9/1982 | Owen ..................... 422/186.07 |
| 4,954,320 A | * | 9/1990 | Birmingham et al. .. 422/186.04 |
| 5,474,747 A | | 12/1995 | Hayashi ...................... 422/177 |
| 5,695,619 A | * | 12/1997 | Williamson et al. ........ 204/177 |
| 5,843,288 A | * | 12/1998 | Yamamoto .................. 204/164 |

FOREIGN PATENT DOCUMENTS

| GB | 2243994 | 11/1991 |
| GB | 2287630 | 9/1995 |

* cited by examiner

*Primary Examiner*—Kishor Mayekar
(74) *Attorney, Agent, or Firm*—William H. Holt

(57) ABSTRACT

A reactor particularly for the plasma treatment of internal combustion engine exhaust gases, in which a power supply and reactor bed are connected directly and enclosed in an earthed metal chamber which both isolates the high voltage power supply and acts as a Faraday cage preventing the emission of electromagnetic radiation from the power supply or plasma.

22 Claims, 5 Drawing Sheets

GAS PURIFICATION DEVICE

This application is a 35 U.S.C. 371 National stage filing of PCT/GB98/02061 filed Jul. 13, 1998.

BACKGROUND OF THE INVENTION

The present invention relates to the processing of gaseous media and in particular to the reduction of the emission of particulate and other materials from the exhausts of internal combustion engines.

One of the major problems associated with the development and use of internal combustion engines is the noxious exhaust emissions from such engines. Two of the most deleterious materials, particularly in the case of diesel engines, are particulate carbon and oxides of nitrogen ($NO_x$) Increasingly severe emission control regulations are forcing internal combustion engine and vehicle manufacturers to find more efficient ways of removing these materials in particular from internal combustion engine exhaust emissions. Unfortunately, in practice, it is found that techniques which improve the situation in relation to one of the above components of internal combustion engine exhaust emissions tend to worsen the situation in relation to the other. Even so, a variety of systems for trapping particulate emissions from internal combustion engine exhausts have been investigated, particularly in relation to making such particulate emission traps capable of being regenerated when they have become saturated with particulate material.

Examples of such diesel exhaust particulate filters are to be found in European Patent Application EP 0 01 0384; U.S. Pat. Nos. 4,505,107; 4,485,622; 4,427,418; and 4,276,066; EP 0 244 061; EP 0 112 634 and EP 0 132 166.

In all the above cases, the particulate matter is removed from the exhaust gases by a simple, physical trapping of particulate matter in the interstices of a porous, usually ceramic, filter body, which is then regenerated by heating the filter body to a temperature at which the trapped diesel exhaust particulates are burnt off. In most cases the filter body is monolithic, although EP 0 010 384 does mention the use of ceramic beads, wire meshes or metal screens as well. U.S. Pat. No. 4,427,418 discloses the use of ceramic coated wire or ceramic fibres.

In a broader context, the precipitation of charged particulate matter by electrostatic forces also is known. However, in this case, precipitation usually takes place upon large planar electrodes or metal screens.

It is known also to remove pollutants from internal combustion engine exhaust gases by establishing an electric discharge in a reactor chamber through which the exhaust gases are made to pass. The electric discharge causes the conversion of the pollutants to less harmful materials, which are discharged from the reactor chamber to the atmosphere. Examples of such devices are given in GB 2 274 412; European Patent Application 0 366 876; OLS DE 3708508; and U.S. Pat. 3,180,083.

However, in the above mentioned systems the high voltages required to excite the electric discharges are generated by power sources which are remote from the devices in which the removal of the pollutants from the exhaust gases is carried out. Not only does this require the use of high voltage transmission systems with their attendant safety implications, but in cases where pulsed dc or ac voltages are used to excite the electric discharges, considerable electromagnetic emissions can occur.

It is an object of the present invention to provide a reactor device especially suitable for the reduction of internal combustion exhaust emissions in which these problems are addressed.

BRIEF SUMMARY OF THE INVENTION

According to the present invention there is provided a reactor for the processing of a gaseous medium, including a reactor bed, means for constraining a gaseous medium to be processed to flow through the reactor bed and a power supply unit adapted to generate and apply a potential across the reactor bed which is sufficient to excite an electric discharge in the gaseous medium flowing through the reactor bed, wherein the reactor bed and the power supply unit are adjacent, directly connected together electrically, preferably co-axial, and preferably are enclosed in an electrically conducting enclosure which is adapted to be maintained at ground potential.

Not only does the grounded enclosure isolate electrically the reactor bed and the power supply unit but it acts as a Faraday cage so as to prevent the emission of electromagnetic radiation when pulsed dc or ac potentials are used to excite the gaseous medium.

Preferably, the enclosure consists of a sealed metal chamber enclosing the reactor bed and the power supply unit.

Preferably the reactor bed consists of a cylindrical body of gas permeable dielectric material contained between two concentric gas permeable electrodes the outer one of which is grounded and the inner one of which is connected directly to the means for generating the said potential.

In a particular embodiment of the invention the reactor chamber is adapted to form part of the exhaust system of an internal combustion engine.

BRIEF DESCRIPTION OF THE SEVERAL VIEWS OF THE DRAWINGS

The invention will now be described, by way of example, with reference to the accompanying drawings in which.

DETAILED DESCRIPTION OF THE INVENTION

Figure 1:
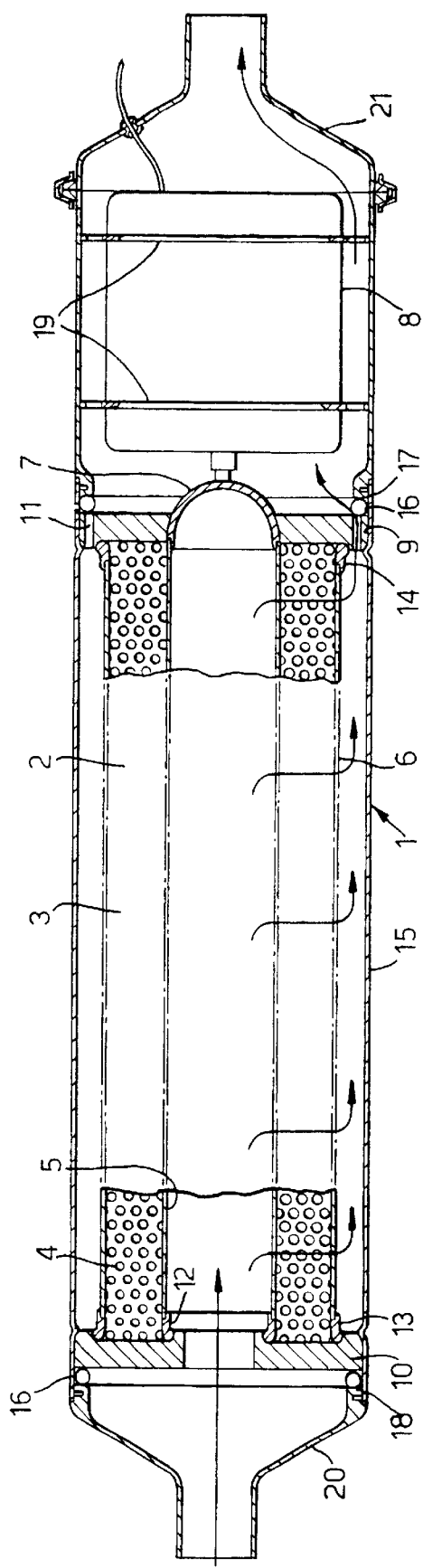
FIG. 1 is a longitudinal section of a reactor for reducing exhaust emissions from an internal combustion engine.

Referring to FIG. 1 of the drawings a reactor assembly 1 for treating the exhaust gases from internal combustion engines comprises a reactor bed 2 which consists of a bed 3 of pellets 4 of a ceramic dielectric material, such as described in our earlier patent GB 2 274 412, which is contained between inner and outer perforated stainless steel electrodes 5 and 6 respectively. The inner electrode 5 is closed by a stainless steel thimble 7 which is connected directly to a high voltage power supply 8, which is capable of delivering 30 kV pulses at a repetition frequency in the range 50 Hz–15 kHz. The ends of the reactor bed 2 are closed by two ceramic end-plates 9 and 10 respectively which also act as support plates. The end-plate 9, which is at the same end of the reactor bed 2 as the thimble 7 has a series of axial holes 11 around its periphery.

Also at the ends of the electrodes 5 and 6 are stainless steel rings 12, 13, and 14 which are so shaped as to reduce as far as is practicable arcing between the ends of the electrodes 5 and 6 and their respective end-plates 9 and 10. The whole assembly is encased in a gas tight stainless steel chamber 15. Thermal expansion of the reactor bed 2 is accommodated by expansion rings 16 positioned between the supports 9 and 10 and respective abutments 17 and 18, which form part of the chamber 15. The power supply 8 is positioned within the chamber 15 by perforated plates or spiders 19. The chamber 15 has inlet and outlet nozzles 20 and 21, respectively, by means of which it can be attached to the remainder of an internal combustion engine exhaust system, which is not shown in the drawing.

The power supply 8, which is positioned at the cooler end of the reactor assembly 1, includes an inverter for converting a dc input 22 from a vehicles power supply to a pulsed, or alternating form and transforming it to some 30 kV before applying it to the inner electrode 5 of the reactor bed 2. Of course it is necessary to ensure that the components of the power supply 8 are capable of operating at the relatively high temperatures which exist in internal combustion engine exhaust systems. The direction of gas flow shown helps to reduce the temperature of the exhaust gases before they reach the power supply 8. However, if the power supply 8 is capable of withstanding the higher temperatures it can be positioned at the other end of the reactor assembly 1.

Figure 2:
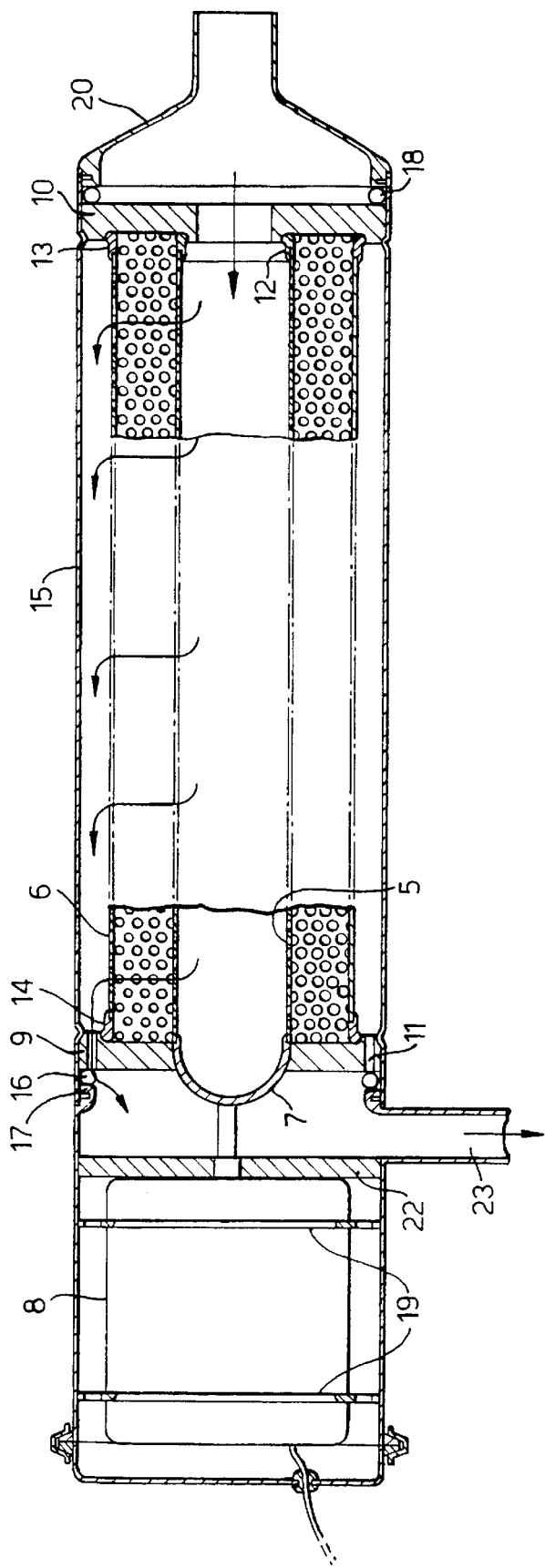
FIG. 2 is a longitudinal section of a second reactor for reducing exhaust emissions from an internal combustion engine.

FIG. 2 shows a second embodiment of the invention which is generally similar to the embodiment of the invention described with reference to FIG. 1. Those features which are common to both embodiments have the same reference numerals. In the second embodiment of the invention a ceramic thermal isolator 22 is interposed between the power supply 8 and a side entrance or exit 23 for the exhaust gases. An advantage of this arrangement is that that part of the chamber 15 which surrounds the power supply 8 can be made of a metal mesh so that cool air can circulate around the power supply 8. The mesh size needs to be small enough to ensure that the efficiency of the chamber 15 as a Faraday cage is not impaired.

Figure 3:
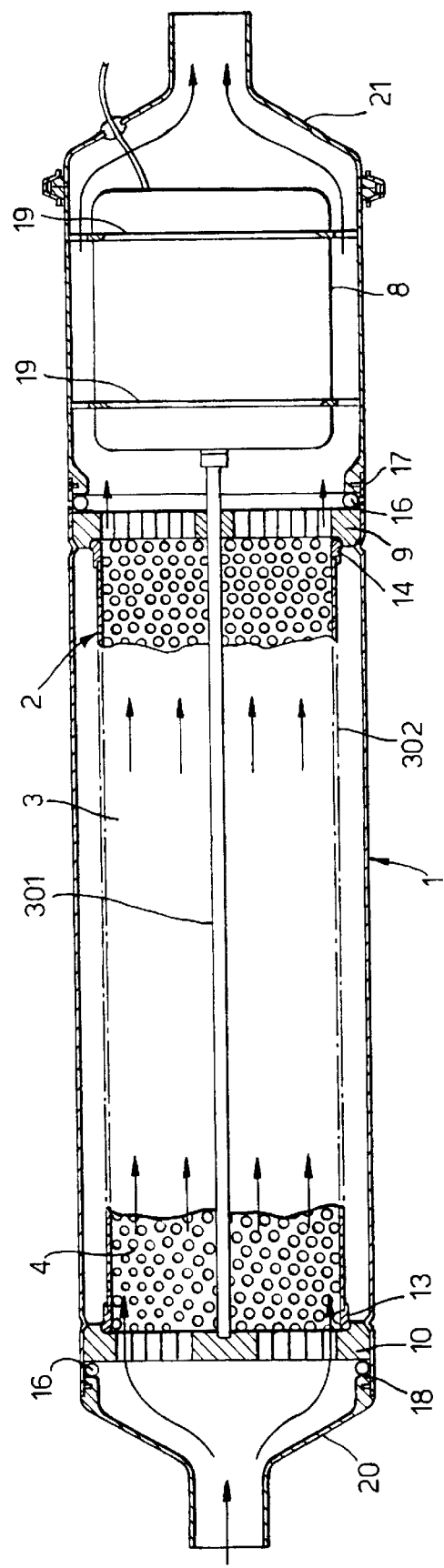
FIG. 3 is a longitudinal section of a third reactor for reducing exhaust emissions from an internal combustion engine.

FIG. 3 shows a third embodiment of the invention which is generally similar to the embodiment of the invention described with reference to FIG. 1. Those features which are common to both embodiments have the same reference numerals. In the third embodiment of the invention, the perforated inner and outer electrodes 5 and 6 are replaced by a central electrode 301 of considerably reduced diameter and a non-perforated outer electrode 302. Also, the support plates 9 and 10 are made of a honeycomb material, which may or may not have catalytic properties with respect to pollutants to be removed from the exhaust gas passing through the reactor, as desired. The exhaust gases being treated are therefore constrained to pass through the reactor bed 2 parallel to the longitudinal axis of the reactor bed 2.

As with the embodiment of the invention described with reference to FIG. 2, a side entrance or exit for the exhaust gases can be employed, with or without a thermal barrier between the power supply unit 8 and the exhaust gases. Also, if desired, the grounded outer electrode can be formed by the metal enclosure 15.

In the embodiments described, the portion of the enclosure 15 covering the power supply unit 8 is made of metal, but if required, it can be made of a conducting heat resistant polymer material.

Figure 4:
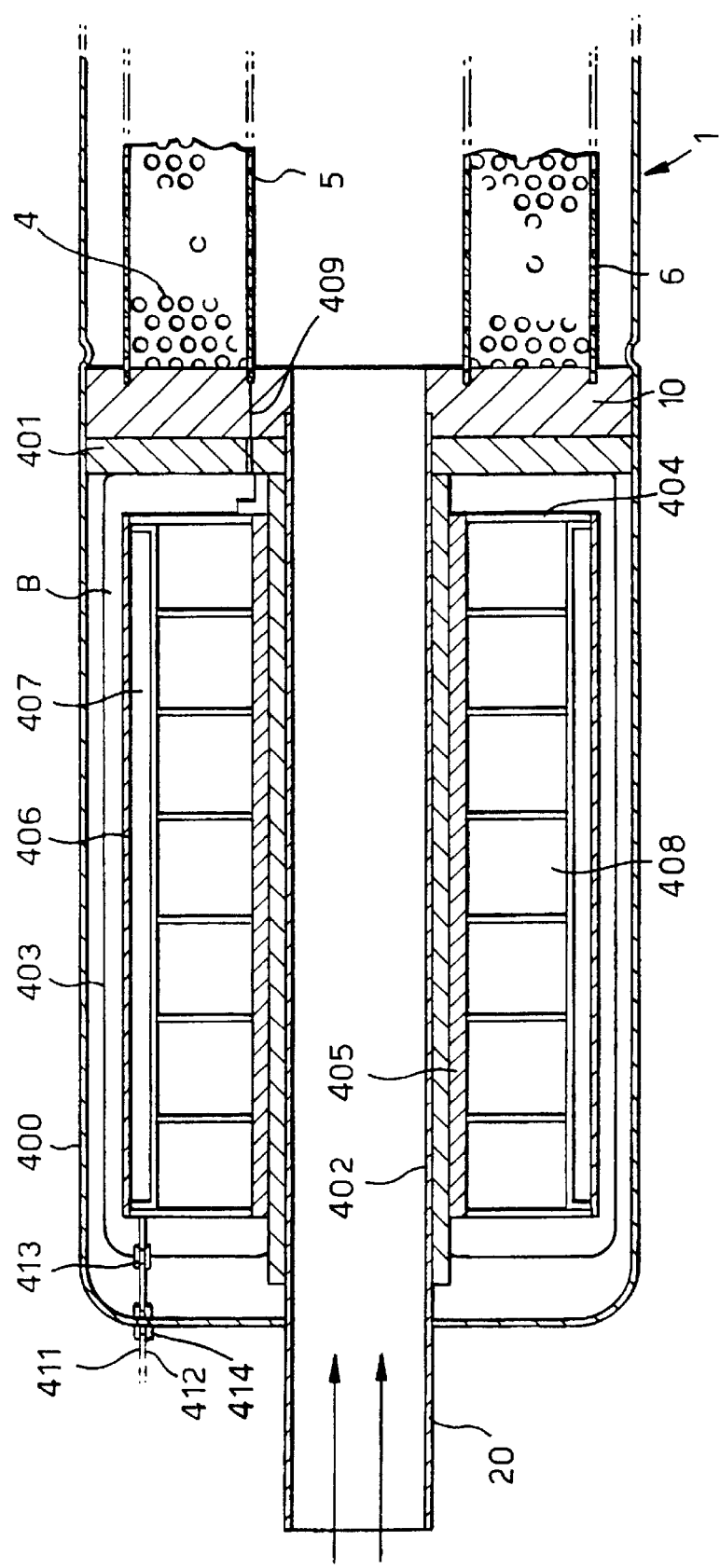
FIG. 4 is a longitudinal section of a portion of another embodiment of the invention.

FIG. 4 illustrates another embodiment of the invention which avoids the need for the power supply to be protected against the gases passing through the reactor 1. Again, those components which are the same as, or similar to, components of the previous embodiments of the invention, have the same reference numerals. Referring to the drawing, the inlet pipe 20 to the reactor chamber 1 passes through a power supply chamber 400 and is mounted in the insulating ceramic electrode support 10. The power supply chamber 400 preferably is made of a ferrous material and is welded to the exhaust pipe 20, both to assist in supporting the exhaust pipe 20 without stressing its inner and, and to maintain the electromagnetic isolation of the power supply 8. Adjacent the electrode support 10 is a thermal barrier 401 made of a ceramic material. Another thermal barrier 402 surrounds the section of the exhaust pipe 10 which is inside the power supply chamber 400. The thermal barriers 401, 402 can be applied, for example, by flame spraying. The housing 403 of the power supply 8 is mounted on the thermal barrier 402 and includes a high voltage transformer 404. The high voltage transformer 404 has a magnetic core in the form of two co-axial cylinders 405 and 406 made of a ferrite or laminated iron material. The core cylinders 405 and 406 can incorporate an air gap at the ends or the middle so as to enable the inductance of the secondary winding to be optimised. The low-voltage primary winding 407 of the high voltage transformer 404 is positioned outside the secondary winding 408, so increasing the insulation distance between the secondary winding 407 of the high-voltage transformer 404 and the metal housing 403 of the power supply 8. The high voltage output from the transformer 404 passes through a gas-tight feed-through in the electrode support 10 into the reactor chamber 1 where it makes contact with the inner electrode 5. The low-voltage supply 411 to the primary winding 407 of the transformer 404 and the earthy end leads 402 from the primary and secondary windings 407, 408, respectively, of the transformer 404 pass through the walls of the power supply housing 8 and power supply chamber 400 via insulating feedthroughs 413, 414, respectively.

The secondary winding 408 is divided into a number of sections, so reducing the secondary capacitance of the transformer. In the arrangement described only the high voltage transformer 404 is within the power supply housing 8, so minimising the number of electrical components subject to heat when the reactor is used to reduce internal combustion engine exhaust emissions.

However, if so desired, the high-frequency low-voltage power signal generator also can be included in the power supply housing 8. This is particularly so if the reactor is to be used for the processing of gaseous media which are at a lower temperature than internal combustion engine exhaust gases, and also to minimise electromagnetic emissions.

The form of power supply described with reference to FIG. 4 can be used with any of the embodiments of the invention previously described, at the inlet or outlet end as desired.

Figure 5:
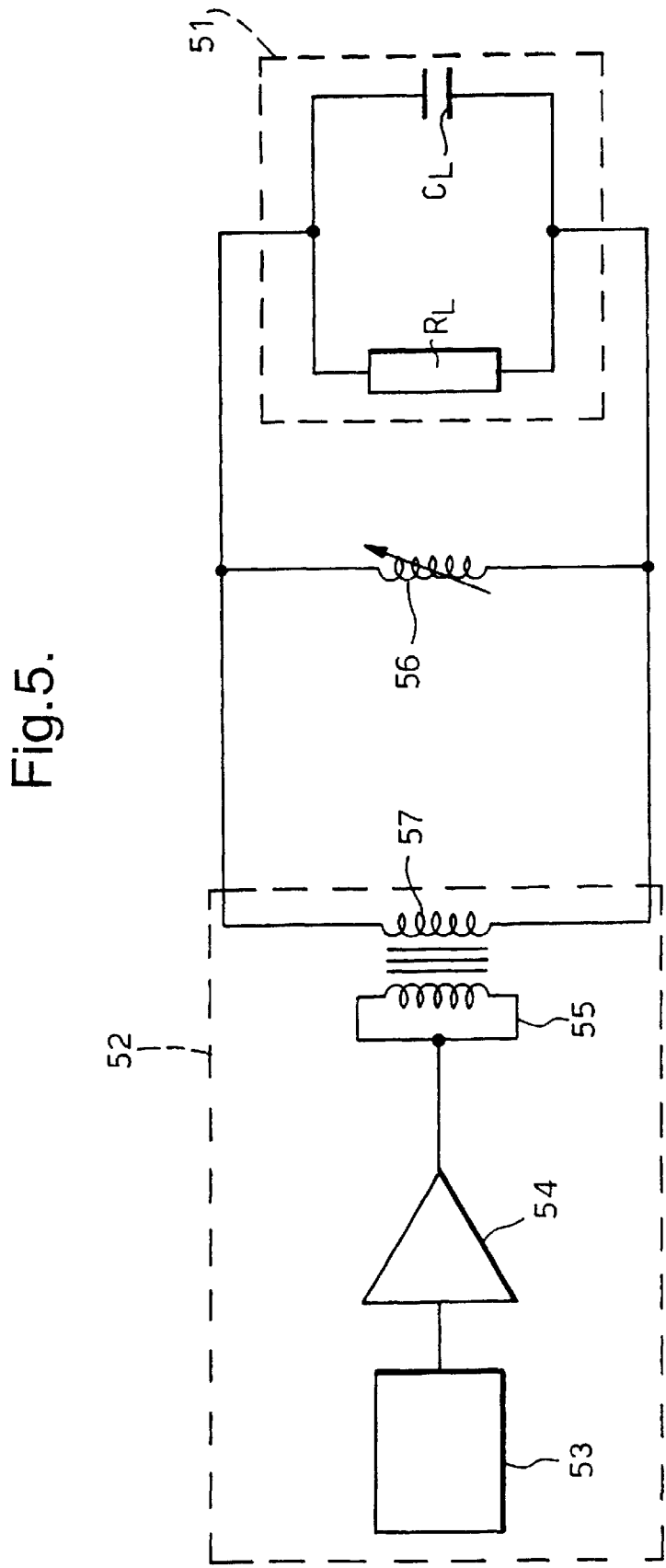
FIG. 5 is a representation of the electrical circuits associated with the present invention.

Referring to FIG. 5, the electrical components of a gas discharge reactor such as those described above can be represented primarily as a resistive load $R_L$ of the order of hundreds of kilo ohms and a capacitive load $C_L$ of the order of hundreds of pico farads in parallel with the resistive load of $R_L$. The reactor 51 is shown as being connected to a power supply 52 which includes a pulsed DC source or AC generator 53, a power amplifier 54 and a step-up transformer 55. The power supply 52 produces an output potential of some 20 kV at a frequency of about 10 kHz. At this sort of frequency, the capacitive current through the reactor 51 may be a factor of ten greater than the resistive current. It is the resistive component of the current flowing through the reactor 51 which is the effective one so far as the operation of the reactor 51 is concerned. In order to minimise the size of the capacitive current drawn from the power supply 52, and hence the size of the power supply 52, a variable inductance 56 is connected in parallel with the reactor 51 and its value is adjusted until the LCR circuit formed by it and the resistive and capacitive components $R_L$ and $C_L$ of the reactor 51 is resonant at the output frequency of the power supply 52. A typical value for the inductance is some 3 henries. At least some of this can be supplied by the secondary winding 57 of the output transformer 55 in the power supply 52. When the LCR circuit is resonant with the output from the power supply 52, the reactive current drawn from the power supply 52 is small, leaving only the resistive component, which therefore can be much greater for a given power supply 2 than otherwise would be the case.

Where the tuning inductance is formed by the secondary winding of the transformer 55 alone. The reactive current will flow through the secondary winding 57 of the transformer 55. At resonance, however, the reactive current will not be seen in the primary winding of the transformer 55, so that the power demanded from the power source 53 will be minimised.

In the case of a reactor for the treatment of vehicle exhaust gases, the AC generator 53 may be driven by the engine of a vehicle in the exhaust system of which the reactor 51 is incorporated. However, a problem which then arises is that the frequency of the output current from the generator 53 is dependent upon the engine speed, which is undesirable, particularly when it is desired to operate the reactor 51 at the resonant frequency of the combined transformer secondary winding 54 and reactor 52 circuit, as above.

One way of overcoming this problem is to incorporate a constant speed drive unit between the engine of the vehicle and the generator 53.

A first form of constant speed drive unit which can be used consists of a variable displacement pump driven by the engine of the vehicle which is connected via a pressure or flow regulating system to an hydraulic motor so as to deliver a constant speed output drive to the generator 53 whatever the engine speed.

A second form of constant speed drive can be provided by including a fluid viscous coupling between the engine and the generator 53. Such couplings consist of a turbine the casing of which is driven by one component of the system and the impellor of which drives the other component of the system. The drive speed is controlled either by varying the amount of fluid in the coupling or by varying the angle of the impeller blades.

A hydro-mechanical constant drive system which can be used consists of a number of driver and driven metal disks, the depth of immersion of which in a bath of a viscous oil can be varied in response to engine speed signals generated by a transducer. As the depth of immersion of the disks is increased, so the slippage between them is reduced, and vice versa.

A purely mechanical adjustable speed system consists of two spring-loaded axially adjustable v-pulleys and belts. The engine is coupled to one pully and the generator 53 to the other. The diameter of the pulley coupled to the engine is varied inversely with the engine speed.

A somewhat similar system employs two conical disks between which there are two planetary cones. Rotation by the engine of the disk coupled to it causes the cones to rotate both the main axis of the drive system and about their own axes. The closer these two rotational speeds are, the slower is the rotation of the other disk connected to the generator 53. Maintenance of the output drive speed is achieved by means of a control ring which alters the rotation of the planetary cones about their own axes.

An electrical controlled speed drive system includes a dc electric motor operated by the vehicle's battery which powers an hydraulic motor which is coupled to the generator 53.

A further controlled speed drive system utilises a variable magnetic field generated across an air gap between two ferromagentic disks, one coupled to the engine and the other to the generator 53.

What is claimed is:

1. A reactor for the processing of a gaseous medium, including a reactor bed, means for constraining a gaseous medium to be processed to flow through the reactor bed, a power supply unit for generating a potential and connected to apply the said potential across the reactor bed, said potential being sufficient to excite an electric discharge in the gaseous medium flowing through the reactor bed, said reactor bed and said power supply unit being adjacent and connected directly together electrically, wherein a casing for the reactor bed and the power supply unit provides therefor an electrically conducting enclosure adapted to be maintained at ground potential.

2. A reactor for the processing of a gaseous medium, including a reactor bed, means for constraining a gaseous medium to be processed to flow through the reactor bed, a power supply unit for generating a potential and connected to apply the said potential across the reactor bed, said potential being sufficient to excite an electric discharge in the gaseous medium flowing through the reactor bed, said reactor bed and said power supply unit being adjacent and connected directly together electrically, wherein the reactor bed comprises a cylindrical body of gas permeable dielectric material contained between an inner gas permeable electrode and an outer gas permeable electrode, said outer electrode being connected to ground and said inner electrode being connected directly to the power supply unit and the reactor being adapted for the gaseous medium to pass radially through the reactor bed, and wherein a casing for the reactor bed and the power supply unit provides therefor an electrically conducting enclosure adapted to be maintained at ground potential.

3. A reactor for the processing of a gaseous medium, including a reactor bed, means for constraining a gaseous medium to be processed to flow through the reactor bed, a power supply unit for generating a potential and connected to apply the said potential across the reactor bed, said potential being sufficient to excite an electric discharge in the gaseous medium flowing through the reactor bed, said reactor bed and said power supply unit being adjacent and connected directly together electrically, wherein the reactor bed comprises a cylindrical body of gas permeable dielectric material contained between an inner non-permeable electrode and an outer non-permeable electrode, said outer electrode being connected to ground and said inner electrode being connected directly to the power supply unit, and the reactor being adapted for the gaseous medium to flow axially through the reactor bed, and wherein a casing for the reactor bed and the power supply unit provides therefor an electrically conducting enclosure adapted to be maintained at ground potential.

4. A reactor for the processing of a gaseous medium, including a reactor bed, means for constraining a gaseous medium to be processed to flow through the reactor bed, a power supply unit for generating a potential and connected to apply the said potential across the reactor bed, said potential being sufficient to excite an electric discharge in the gaseous medium flowing through the reactor bed, said reactor bed and said power supply unit being adjacent and connected directly together electrically, wherein the reactor bed comprises a cylindrical body of gas permeable dielectric material contained between an inner non-permeable electrode and an outer non-permeable electrode, said outer electrode being connected to ground and said inner electrode being connected directly to the power supply unit, and the gaseous medium being constrained to flow axially through the reactor bed, the reactor bed and the power supply unit being enclosed in an electrically conducting enclosure adapted to be maintained at ground potential, the reactor bed being positioned within said enclosure by gas permeable supports which are made of a ceramic material which has catalytic properties with respect to constituents of the gaseous medium to be processed within the reactor.

5. A reactor according to claim 4, wherein there is included an axial duct communicating with the interior of said enclosure and the power supply unit is contained in a housing which has a cylindrical configuration with an axial hole through which the said duct passes.

6. A reactor for the processing of a gaseous medium, including a reactor bed, means for constraining a gaseous medium to be processed to flow through the reactor bed, a power supply unit for generating a potential and connected to apply the said potential across the reactor bed, said potential being sufficient to excite an electric discharge in the gaseous medium flowing through the reactor bed, said reactor bed and said power supply unit being adjacent and connected directly together electrically, wherein the reactor bed and the power supply unit have electrically conducting material therearound adapted to be maintained at ground potential.

7. A reactor as claimed in claim 6, wherein the said electrically conducting material serves as a Faraday cage.

8. A reactor as claimed in claim 7, wherein the said electrically conducting material is provided by a casing forming an electrically conducting enclosure for the reactor bed and the power supply unit.

9. A reactor as claimed in claim 6, wherein the said electrically conducting material is provided by a casing forming an electrically conducting enclosure for the reactor bed and the power supply unit.

10. A reactor according to claim 6 wherein the reactor bed comprises a cylindrical body of gas permeable dielectric material contained between an inner gas permeable electrode and an outer gas permeable electrode, said outer electrode being connected to ground and said inner electrode being connected directly to the power supply unit and the reactor being adapted for the gaseous medium to pass radially through the reactor bed.

11. A reactor according to claim 6 wherein the reactor bed comprises a cylindrical body of gas permeable dielectric material contained between an inner non-permeable electrode and an outer non-permeable electrode, said outer electrode being connected to ground and said inner electrode being connected directly to the power supply unit, and the reactor being adapted for the gaseous medium to flow axially through the reactor bed.

12. A reactor according to claim 6, wherein the power supply unit is adapted to produce a pulsed or alternating output voltage.

13. A reactor according to claim 6, wherein the reactor bed can be represented as an electrical load, and the reactor bed is connected to means which together with the said electrical load represented by the reactor bed form an electrical load having a resonant frequency substantially equal to the frequency of the output from the power supply unit.

14. A reactor according to claim 13 wherein the said means to which the electrical load represented by the reactor bed is connected, comprises an appropriate inductance connected in parallel with the electrical load.

15. A reactor according to claim 14 wherein the power supply unit is adapted to generate a voltage of the order of tens of kilovolts at a frequency within the range 50 Hz to 15 kHz.

16. A reactor according to claim 13 wherein the power supply unit is adapted to generate a voltage of the order of tens of kilovolts at a frequency within the range 50 Hz to 15 kHz.

17. A reactor according to claim 6 to be incorporated into an exhaust system of an internal combustion engine.

18. A reactor according to claim 17 in combination with a step-up transformer having a primary winding and a secondary winding, an ac generator connected to the said primary winding of the transformer, and means for maintaining the frequency of output from the ac generator at a predetermined value regardless of variations in rotational speed of an internal combustion engine in the exhaust system of which the reactor is incorporated.

19. A reactor system according to claim 18 wherein the ac generator is connected to be driven by the engine via a constant speed drive system.

20. A reactor system according to claim 19 wherein the constant speed drive system comprises an hydraulic drive unit the drive efficiency of which is varied inversely with the rotational speed of the engine.

21. A reactor system according to claim 19 wherein the constant speed drive system comprises a stepless variable speed transmission system the effective gear ratio of which is varied inversely with the rotational speed of the engine.

22. A reactor system according to claim 19 wherein the constant speed drive system includes an electromagnetic clutch the drive efficiency of which is varied inversely with the rotational speed of the engine.

* * * * *